United States Patent [19]

Fricke et al.

[11] Patent Number: 5,398,607
[45] Date of Patent: Mar. 21, 1995

[54] PREGRIPPER IN A SHEET-FED PRINTING MACHINE

[75] Inventors: Andreas Fricke, Eberbach; Burkhard Maass; Jürgen Rautert, both of Heidelberg, all of Germany

[73] Assignee: Heidelberger Druckmaschinen AG, Heidelberg, Germany

[21] Appl. No.: 133,461

[22] Filed: Oct. 8, 1993

[30] Foreign Application Priority Data

Oct. 8, 1992 [DE] Germany ............ 42 33 846.8

[51] Int. Cl.⁶ .................................. B41F 2/04
[52] U.S. Cl. .................. 101/409; 271/277; 101/415.1
[58] Field of Search ............ 101/408, 409, 410, 415.1, 101/382.1, 378; 271/277

[56] References Cited

U.S. PATENT DOCUMENTS

| 3,116,923 | 1/1964 | Günther . |
| 4,295,422 | 10/1981 | Thunker .................. 101/409 |
| 4,372,209 | 2/1983 | Jentzsch et al. .............. 101/409 |
| 4,730,557 | 3/1988 | Wieland .................. 101/415.1 |
| 4,854,236 | 8/1989 | Thünker et al. . |
| 4,862,801 | 9/1989 | Marmin .................. 101/415.1 |
| 4,905,985 | 3/1990 | Nagatani .................. 101/409 |
| 4,993,275 | 2/1991 | Pollich et al. . |
| 5,076,165 | 12/1991 | Pollich .................. 101/409 |

FOREIGN PATENT DOCUMENTS

| 0089080 | 9/1983 | European Pat. Off. ......... 101/415.1 |
| 1263434 | 3/1968 | Germany . |
| 2200187 | 8/1972 | Germany .................. 101/415.1 |
| 3226119 | 4/1983 | Germany .................. 101/415.1 |
| 8620766 | 2/1988 | Germany . |
| 3922186 | 1/1991 | Germany . |
| 3830946 | 5/1991 | Germany . |
| 4109409 | 10/1991 | Germany . |
| 4109824 | 10/1991 | Germany . |
| 271954 | 11/1950 | Switzerland .................. 101/415.1 |
| 2233728 | 1/1991 | United Kingdom . |

Primary Examiner—Eugene H. Eickholt
Attorney, Agent, or Firm—Herbert L. Lerner; Laurence A. Greenberg

[57] ABSTRACT

A pregripper configuration in a sheet-fed rotary printing press feeds single sheets to a rotating cylinder. A cam drive includes a main cam and a roller lever which pivots about a frame-fixed shaft. A lever mechanism, which is articulated to the roller lever and a pregripper pivot arm, transmits the motion of the cam-following roller lever to the pivot arm. The pivot arm is also pivoted about a frame-fixed shaft. In order to compensate for play in the lever mechanism, a pretensioned spring is disposed between an attachment point on the roller lever and an attachment point on the pivot arm. In one embodiment, the pretensioned spring extends approximately parallel to a rigid link connected in articulated fashion between the roller lever and the pivot arm. In another embodiment, the spring is attached to a compensating cam drive.

10 Claims, 2 Drawing Sheets

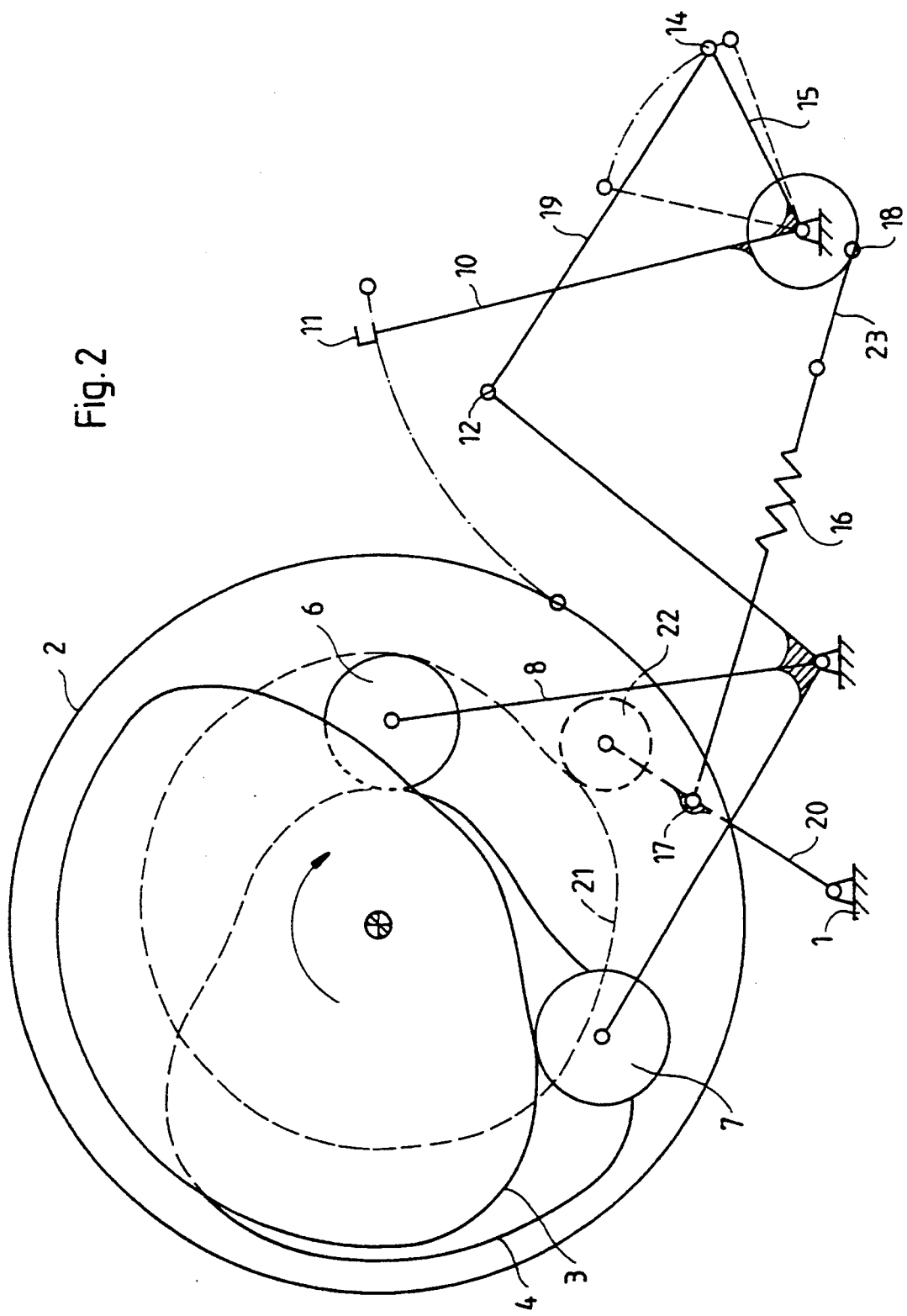

PREGRIPPER IN A SHEET-FED PRINTING MACHINE

BACKGROUND OF THE INVENTION

1. Field of the Invention

The invention relates to a pregripper configuration for single-sheet feeding to a rotating cylinder of a sheet-fed rotary printing press, generally with a pregripper pivot arm pivotally mounted at a printing press frame, a cam drive with a cam, a roller lever which is pivotable about a pivot shaft which is fixed relative to the printing press frame, and lever means articulatingly connected between the roller lever and the pregripper pivot arm for transmitting a motion of the roller lever to the pregripper pivot arm.

2. Description of the Related Art

A pregripper drive for such a pregripper is known from U.S. Pat. No. 4,993,275 to Pollich et al. of Heidelberger Druckmaschinen. In addition to a main cam disk for driving the pregripper, a complementary auxiliary cam disk is disposed on the same shaft, with the result that two rollers, held at the ends of a angular double-crank roller lever, positively guide the roller lever motion. According to that patent, the roller lever, in turn, is disposed in a fixed manner on an oscillatingly moved pregripper shaft or its motion is transmitted by a lever mechanism to a rocker arm. That rocker arm is held at one end on a frame-fixed shaft and it carries the pregripper mechanism at its other end.

The transfer of a sheet from a feed table to a cylinder of the printing press (the cylinder, of course, rotates at printing-press speed), places particular demands on the pregripper drive and on other main and auxiliary components. Firstly, the previously stationary sheet must be accelerated to the peripheral speed of the cylinder. Secondly, the sheet must be positioned extremely accurately with its leading edge, so as to make a secure transfer to the gripper mechanism of the cylinder possible. That accurate sheet positioning must also be guaranteed in the case of the repeated passage of the sheet at different press speeds.

Undesirable dynamic effects, particularly vibrations, extreme peak values of the periodic driving torque at the pregripper drive and similar effects, must be prevented by providing small acceleration peaks in the swivel motion of the pregripper. This can be achieved for the aforementioned operation, for instance, by providing a large printing press angular interval and by a long transfer path from the feed table to the cylinder. A desirable stable construction of the pregripper is assisted by choosing a short pregripper, i.e. by providing a short distance between the gripper clamp and the pregripper pivot point. This, however, means that, in order to produce the periodic motion of the pregripper, it is necessary to have a non-uniformly acting drive mechanism with a plurality of members. All of the members are interconnected by joints, which, even in the case of positive form-locking construction, are subject to play.

Play in the joints—due to the periodically changing forces in the joints—causes backlash or contact changes in the joint elements. This leads to changes in the transmission behavior of the pregripper drive. Register inaccuracies are the result. A periodically changing driving torque causes irregular printing-press operation, which is detrimental to the quality of the printed products.

In order to eliminate play in the joints of articulated drives, it has been heretofore known, for example, to employ torsion springs, through which the parts of the lever mechanism are braced together. Such a system is shown in German published, non-prosecuted application DE 39 22 186 A1 (corresponding the UK patent application 2 233 728 A). It has also been known to provide a longitudinal spring instead of such torsion springs. This spring, however, is so disposed that torques occur at the drive shaft of the pregripper drive and of a compensating drive. These torques cause apparent power and power losses in the printing press. In the case of a symmetrical pregripper motion, for instance, roller forces at the pregripper drive are necessarily doubled. For the purpose of power compensation, it is known from the aforementioned DE 39 22 186 A1 to provide a compensating drive, which acts directly on the pregripper pivot arm. This minimizes the forces in the pregripper drive. The motion characteristic during the forward and backward movement of the pregripper, however, is identical, with the result that, in order to obtain the maximum effect, the law of motion of the pregripper must be symmetrical. Other devices for power compensation involving a very high structural outlay are known from German published, non-prosecuted applications DE 41 09 409 A1 and DE 41 09 824 A1. Configurations for power compensation according to German patent DE 12 63 434 B2 and according to U.S. Pat. No. 4,854,236 to Thinker et al. are external. This has the effect that a combination with means for the compensation of play in the drive is not possible.

SUMMARY OF THE INVENTION

It is accordingly an object of the invention to provide a pregripper in a sheet-fed rotary printing machine, which overcomes the hereinafore-mentioned disadvantages of the heretofore- known devices of this general type, i.e. to provide a pregripper with a zero-play pregripper drive and with a minimum in possible dynamic reaction, controllable where appropriate, on the printing press and its drive.

With the foregoing and other objects in view there is provided, in accordance with the invention, a pregripper configuration for single-sheet feeding to a rotating cylinder in a sheet-fed rotary printing press, comprising:
  a pregripper pivot arm pivotally mounted at a printing press frame;
  a cam drive, including a cam, a roller lever pivotable about a pivot shaft being fixed relative to the printing press frame, and lever means articulatingly connected between the roller lever and the pregripper pivot arm for transmitting a motion of the roller lever to the pregripper pivot arm;
  a rigid link having a first end articulated at the roller lever and a second end articulated at the pivot arm;
  the roller lever having a roller lever attachment point and the pivot arm having a pivot arm attachment point; and
  an initially tensioned spring disposed between the roller lever attachment point and the pivot arm attachment point, the spring extending approximately parallel to the rigid link.

In accordance with an added feature of the invention, the spring is a helical spring, and the pregripper includes a further lever having a spring attachment point, the further lever being rigidly connected to the roller lever, and it further includes a rocker rigidly connected to the pregripper pivot arm, the pivot arm attachment point being disposed on the rocker, and the helical spring being tensed between the spring attachment point and the pivot arm attachment point.

In accordance with an additional feature of the invention, the first end of the rigid link is articulated between the spring attachment point and the pivot shaft of the roller lever, and the second end of the rigid link is articulated at the pivot arm between a pivot point of the pivot arm and the pivot arm attachment point.

In accordance with another feature of the invention, the first end of the rigid link is articulated on the further lever between the spring attachment point and the pivot shaft of the roller lever, and the second end of the rigid link is articulated on the rocker between a pivot point of the pivot arm and the pivot arm attachment point.

In accordance with a further feature of the invention, the pregripper pivot arm moves between pregripper end positions, the roller lever attachment point and the pivot arm attachment point being positioned such that the spring substantially retains its length during a movement of the pivot arm between the pregripper end positions. Alternatively, the spring changes its length by a predetermined amount during a movement of the pivot arm between the pregripper end positions.

In accordance with again a further feature of the invention, the pregripper configuration includes a rocker rigidly attached to the pivot arm and defining an angle therewith, a further lever rigidly attached to the roller lever and defining an angle therewith, the pivot arm attachment point being disposed on the rocker and the roller lever attachment point being disposed on the further lever, the roller lever attachment point following an approximately circular segment when the pivot arm moves between end positions of the pregripper configuration, the pivot arm attachment point defining a center of the circular segment.

These structural features ensure that it is possible with only a single spring to compensate for the bearing play in a pregripper drive in which the spring forces act only within the lever mechanism. The spring forces have no effect on the contact pressure of the cam roller at the free end of the roller lever or on the cam plate. Furthermore, they have also no effect on the pregripper mechanism.

It is still possible, in addition to the compensation of play, to obtain a partial compensation of power. When the attachment points of the spring are appropriately chosen, at one end on the roller lever and at the other end on the swing arm of the pregripper, the result is a desired increase or reduction of the spring length during the operation of the pregripper. Consequently, energy is stored during the motion of the swivel arm, and the energy is again released in order to accelerate the pregripper out of the end positions. Thus, a portion of the kinetic energy which has to be dissipated in order to decelerate the pregripper and which has to be applied in order to accelerate the pregripper out of its end positions, is transferred back and forth between the spring and the pregripper. Consequently, the driving torque for the pregripper, picked off from the feeding cylinder, has smaller positive and negative peak values. The number of components required for the implementation of the invention is limited to a minimum.

Based on customary embodiments of the roller levers for pregripper drives and the pivot arm structure of such pregrippers, it is provided that a helical spring is biased between an attachment point on a lever rigidly connected to the roller lever and an attachment point on a rocker rigidly connected to the swing arm of the pregripper. This illustrates that the inventive configuration is applicable in the case of lever mechanisms which, for the purpose non-uniform transmission of motion, include a plurality of members interconnected by joints.

With the above-noted and other objects in view, there is further provided, in accordance with the invention, a pregripper configuration for single-sheet feeding to a rotating cylinder in a sheet-fed rotary printing press, comprising: a pregripper pivot arm pivotally mounted at a printing press frame; a main cam drive, including a main cam, a roller lever pivotable about a pivot shaft and being fixed relative to the printing press frame, and lever means articulatingly connected between the roller lever and the pregripper pivot arm for transmitting a motion of the roller lever to the pregripper pivot arm; a compensating cam drive having a compensating cam plate and a compensating roller lever; and a tension spring attached between the pregripper pivot arm and the compensating roller lever, the compensating roller lever being pivotable about a point being fixed relative to the printing press frame and being driven by the compensating cam plate.

In accordance with again another feature of the invention, the rotating cylinder of the printing press rotates about a given cylinder axis, and the device includes a complementary cam and a cam follower disposed on the roller lever, the main cam, the complementary cam and the compensating cam being disposed mutually coaxially and coaxially with the rotating cylinder of the printing press.

In accordance with a concomitant feature of the invention, the pregripper configuration includes a component attached to the pregripper pivot arm and a tension member connected between the component and the tension spring.

The object of providing a zero-play configuration of the pregripper lever mechanism and of compensating for power in a controllable manner leads to this further embodiment of the invention. A tension spring is attached between the pivot arm of the pregripper and a second roller lever. The second roller lever is a cam follower driven on a compensating cam plate.

That structure differs from the first embodiment in that, when the pregripper is moved, the spring is tensioned only to the extent that, during the significant phase with regard to sheet transfer, there is no possibility of a change of contact in the play-affected joints. For this purpose, the spring is moved during that phase in such a manner that its length does not change; at the same time, however, a force is exerted by the compensating cam plate, acting on the second roller lever. That force eliminates any possible play in the lever mechanism.

When the pregripper is reversed after a sheet transfer, a contact change may occur in the rotary joints of the lever mechanism and it may cause the cam roller to contact the auxiliary cam. That, however, has no influence on the register accuracy. With the pregripper in the end position, the spring is relaxed by the law of motion provided in the compensating cam plate and the potential energy released is used to accelerate the pregripper for its return motion. When the other end position is reached, the same amount of potential energy has been stored in the spring, because the spring is deflected as in its initial state.

Other features which are considered as characteristic for the invention are set forth in the appended claims.

Although the invention is illustrated and described herein as embodied in a pregripper in a sheet-fed rotary printing machine, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 2 is a schematic side-elevational view of a spring configuration for compensating play and for controlled power compensation.

DESCRIPTION OF THE PREFERRED EMBODIMENTS

Figure 1:
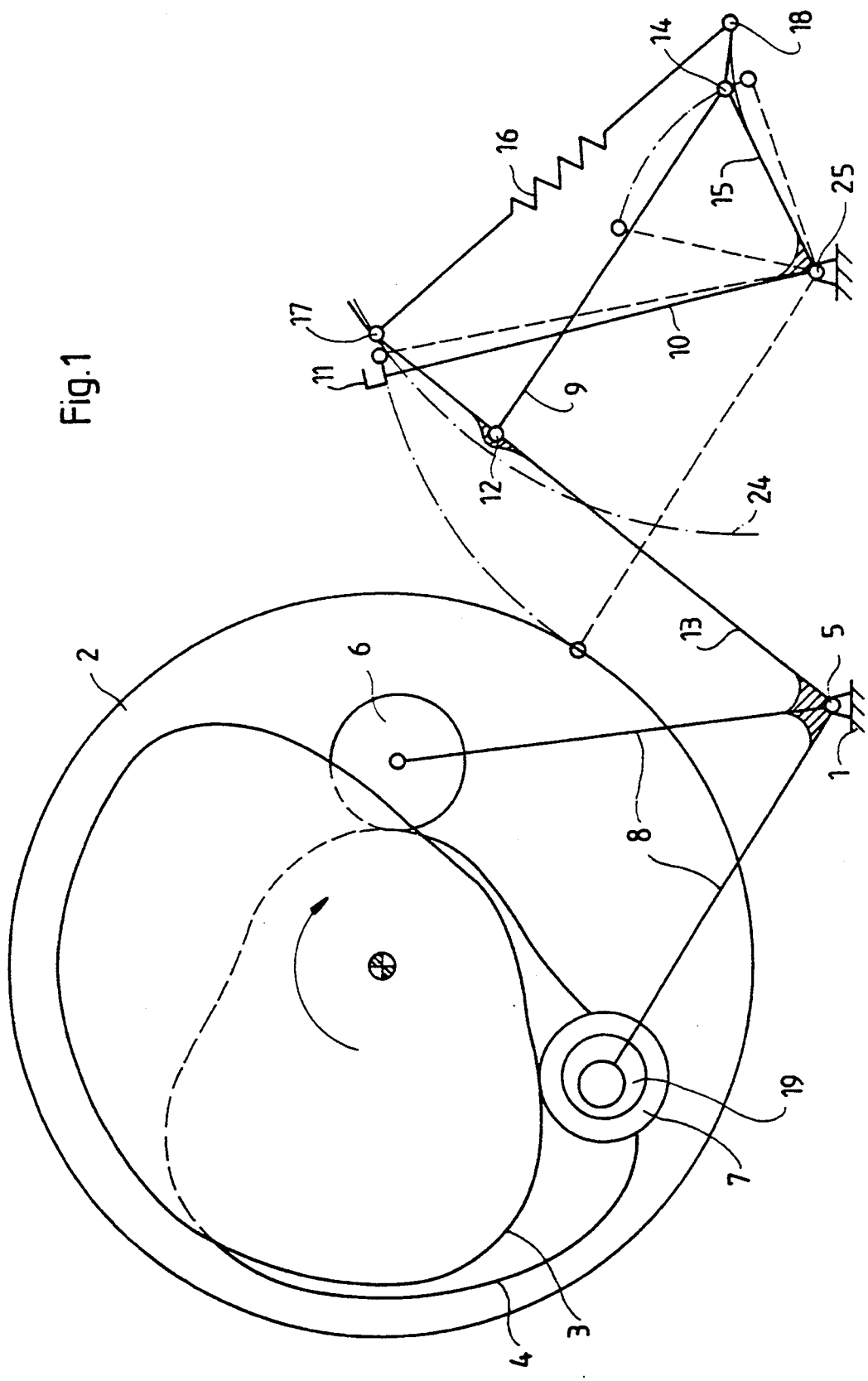
FIG. 1 is a schematic side-elevational view of a spring configuration for compensating play in a lever drive.

Referring now to the figures of the drawing in detail and first, particularly, to FIG. 1 thereof, there is seen a main cam plate 3 and an auxiliary cam plate 4. The two cam plates 3 and 4 are mounted at an end face of a sheet-guiding cylinder 2, which, in turn, is rotatably mounted in a printing-press frame 1. The cam plates 3 and 4 may also be articulated at another driven shaft. A cam follower in the form of a cam roller 7 is braced into contact with the main cam of the cam plate 3. A cam roller 6 is in contact with the auxiliary cam 4. The cam rollers 6 and 7 are rotatably supported on the free ends of a forked or double-crank roller lever 8. A rotary motion of the cylinder 2 is thus converted into an oscillating motion by the intermediary of the cam plates 3 and 4.

The double-crank roller lever 8 is pivotally mounted in a bearing 5, which is fixed relative to the frame 1. The double-crank roller lever 8 is connected in an articulated manner to the pivot arm 10 of a pregripper 11 through a rigid link 9. For the purpose of increasing the pivot angle, one end of the link 9 is connected at a joint 12 to a lever 13. The lever 13 is integral with the double-crank roller lever 8. The other end of the link 9 is connected to a rocker 15 at a joint 14. The rocker 15 is integral with the pregripper pivot arm 10. The pivot arm 10 with the rocker 15 is pivoted about a pivot point 25, which is fixed relative to the machine frame.

A tension spring 16 (e.g. a helical spring) is attached between an attachment point 17 on the roller lever arm 13 and an attachment point 18 on the rocker 15 of the pivot arm 10. The tension spring 16 extends near the link 9. The attachment points 17 and 18 are selected such that, when the pivot arm 10 is moved, the attachment point 17 moves approximately on a circular path 24. The center point of the circular path 24 coincides with the attachment point 18, with the result that, when the pivot arm is pivoted, there is basically no change in the length of the spring 16. This permits effective bracing of the levers of the lever mechanism without a backlash on the contact pressure of the cam rollers 6 and 7.

The production- or installation-inherent play in the cam drive can be eliminated to a very large extent in that one of the two cam rollers 6 and 7 is provided with an eccentric bearing 19, which allows readjustment in order to compensate for any play.

Diverging from the above-mentioned elimination of play in the joints, such an apparatus can also be used for partial compensation of power. For this purpose, the attachment point 18 of the tensed spring 16 must be moved closer to the path of motion of the attachment point 17 during gripper motion. This increases the length of the spring when the rocker 15 is moved into one of its two end positions, which are indicated in the drawing by dashed lines. In the process, kinetic energy is stored in the spring. The energy is then released in order to accelerate the pregripper out of its end positions, as has already been described above.

The structure shown in FIG. 2 is basically identical in construction with the arrangement shown in FIG. 1. One of the differences is found in the fact that the spring 16 is disposed between an attachment point 18 on the pivot arm 10 and an attachment point 17 on a second roller lever 20. The second roller lever 20 is a cam follower of a compensating cam plate 21, which is disposed coaxially with the main cam plate 3 and the auxiliary cam plate 4. All of the cams are thus also coaxial with respect to the axis of the cylinder 2. A cam roller 22 disposed at the end of the second roller lever 20 follows the compensating cam plate 21. In this configuration, the spring 16 can only be tensed to the extent that, in the important phase with regard to sheet transfer (i.e. during the acceleration of the sheet and its transport from the feed table to the cylinder), there is no possibility of a contact shift in the play-affected joints.

The spring 16 is connected to the pivot arm 10 by a tension member 23. During the important phase of motion, the spring motion is thus corrected in such a manner that there is no change in its length. At the same time, an additional force is exerted by the compensating cam plate 21, through the intermediary of the additional roller lever 20, in order to eliminate the play in the lever mechanism. As mentioned above, a change of direction of pregripper acceleration after a sheet transfer may cause a change of contact in the rotary joints in the lever mechanism and may possibly cause an increase in the contact pressure of the cam roller 7 against the auxiliary cam plate 4. That, however, does not affect the technologically important register accuracy.

In the region of the end position of the pregripper 11, the spring 16 is relaxed by the law of motion integrally allowed for in the compensating cam plate 21. The potential energy which is thus "released" is used to accelerate the pregripper in its return motion. In the other end position, the same amount of potential energy has again been stored in the spring, because the spring is elongated relative to its initial state. In this configuration, the entire drive is braced during sheet transfer, and any possible play in the joints is eliminated. If a weak spring is used, it is permissible to employ reduced precision in the manufacture of the biasing components, i.e. the components for pretensioning. Through appropriate specification of the law of motion of the compensating cam plate 21 it is partially possible to compensate the non-uniform driving torque for the return motion of the pregripper. In contrast to the previously described structure, a considerable reduction of the bracing and thus of the forces in the joints is possible, since positive operation in the lever mechanism after sheet transfer is ensured by the form-locking connection of the cam roller 6 and of the auxiliary cam plate 4. A greatly reduced reactive power flows between the pregripper and the compensating drive. Consequently, the components may be lightweight and of a compact structure. It is thus possible to do without the eccentric bearing 19 for adjusting the cam rollers.

We claim:

1. A pregripper configuration for single-sheet feeding to a rotating cylinder in a sheet-fed rotary printing press, comprising:

a pregripper pivot arm pivotally mounted at a printing press frame;

a cam drive, including a cam, a roller lever pivotable about a pivot shaft being fixed relative to the printing press frame, and lever means articulatingly connected between said roller lever and said pregripper pivot arm for transmitting a motion of said roller lever to said pregripper pivot arm;

a rigid link having a first end articulated at said roller lever and a second end articulated at said pivot arm;

said roller lever having a roller lever attachment point and said pivot arm having a pivot arm attachment point; and an initially tensioned spring disposed between said roller lever attachment point and said pivot arm attachment point, said spring extending approximately parallel to said rigid link.

2. The pregripper configuration according to claim 1, wherein said spring is a helical spring, and including a further lever having a spring attachment point, said further lever being rigidly connected to said roller lever, and including a rocker rigidly connected to said pregripper pivot arm, said pivot arm attachment point being disposed on said rocker, and said helical spring being tensed between said spring attachment point and said pivot arm attachment point.

3. The pregripper configuration according to claim 1, wherein said first end of said rigid link is articulated between said spring attachment point and the pivot shaft of said roller lever, and said second end of said rigid link is articulated at said pivot arm between a pivot point of said pivot arm and said pivot arm attachment point.

4. The pregripper configuration according to claim 2, wherein said first end of said rigid link is articulated on said further lever between said spring attachment point and the pivot shaft of said roller lever, and said second end of said rigid link is articulated on said rocker between a pivot point of said pivot arm and said pivot arm attachment point.

5. The pregripper configuration according to claim 1, wherein said pregripper pivot arm moves between pregripper end positions, said roller lever attachment point and said pivot arm attachment point being positioned such that said spring substantially retains its length during a movement of said pivot arm between the pregripper end positions.

6. The pregripper configuration according to claim 1, wherein said pregripper pivot arm moves between pregripper end positions, said roller lever attachment point and said pivot arm attachment point being positioned such that a length of said spring changes by a predetermined amount during a movement of said pivot arm between the pregripper end positions.

7. The pregripper configuration according to claim 1, including a rocker rigidly attached to said pivot arm and defining an angle therewith, a further lever rigidly attached to said roller lever and defining an angle therewith, said pivot arm attachment point being disposed on said rocker and said roller lever attachment point being disposed on said further lever, said roller lever attachment point following an approximately circular segment when said pivot arm moves between end positions of the pregripper configuration, said pivot arm attachment point defining a center of the circular segment.

8. A pregripper configuration for single-sheet feeding to a rotating cylinder in a sheet-fed rotary printing press, comprising:

a pregripper pivot arm pivotally mounted at a printing press frame;

a main cam drive, including a main cam, a roller lever pivotable about a pivot shaft and being fixed relative to the printing press frame, and lever means articulatingly connected between said roller lever and said pregripper pivot arm for transmitting a motion of said roller lever to said pregripper pivot arm;

a compensating cam drive having a compensating cam plate and a compensating roller lever; and a tension spring attached between said pregripper pivot arm and said compensating roller lever, said compensating roller lever being pivotable about a point being fixed relative to the printing press frame and being driven by said compensating cam plate.

9. The pregripper configuration according to claim 8, wherein the rotating cylinder of the printing press rotates about a given cylinder axis, and including a complementary cam and a cam follower disposed on said roller lever, said main cam, said complementary cam and said compensating cam being disposed mutually coaxially and coaxially with the rotating cylinder of the printing press.

10. The pregripper configuration according to claim 8, including a component attached to said pregripper pivot arm and a tension member connected between said component and said tension spring.

* * * * *